US012586113B2

(12) United States Patent
Van Rompaye et al.

(10) Patent No.: US 12,586,113 B2
(45) Date of Patent: Mar. 24, 2026

(54) SYSTEM-USER INTERACTION RELATING TO ADVICE

(71) Applicant: KBC GROEP NV, Brussels (BE)

(72) Inventors: Bart Van Rompaye, Kaggevinne (BE); Mehmet Ali Abdulhayoglu, Leuven (BE); Georgia Alevizopoulou, Leuven (BE); Krina Menounou, Leuven (BE); Geert Huyghe, Schaarbeek (BE); Siegfried Top, Heverlee (BE); Peter Seys, Moerbeke-Waas (BE); Kristina Dudejova, Fentange (LU); Bart Vrelust, 's Gravenwezel (LU); Barak Chizi, Woluwe (BE)

(73) Assignee: KBC GROEP NV, Brussels (BE)

( * ) Notice: Subject to any disclaimer, the term of this patent is extended or adjusted under 35 U.S.C. 154(b) by 764 days.

(21) Appl. No.: 17/287,010

(22) PCT Filed: Oct. 25, 2019

(86) PCT No.: PCT/EP2019/079292
§ 371 (c)(1),
(2) Date: Apr. 20, 2021

(87) PCT Pub. No.: WO2020/084149
PCT Pub. Date: Apr. 30, 2020

(65) Prior Publication Data
US 2021/0390608 A1 Dec. 16, 2021

(30) Foreign Application Priority Data
Oct. 26, 2018 (EP) ..................................... 18202953

(51) Int. Cl.
G06Q 30/0201 (2023.01)
G06Q 30/0601 (2023.01)
G06Q 40/06 (2012.01)

(52) U.S. Cl.
CPC ..... *G06Q 30/0631* (2013.01); *G06Q 30/0206* (2013.01); *G06Q 40/06* (2013.01)

(58) Field of Classification Search
CPC ........... G06Q 30/0631; G06Q 30/0206; G06Q 40/06; G06Q 10/04
See application file for complete search history.

(56) References Cited

U.S. PATENT DOCUMENTS

| | | | | | |
|---|---|---|---|---|---|
| 7,680,719 | B1 * | 3/2010 | Brady | .................... | G06Q 40/06 705/36 R |
| 7,822,669 | B2 * | 10/2010 | Tyagi | .................... | G06Q 50/16 705/36 R |
| 8,332,740 | B2 * | 12/2012 | Graham | ............... | G06Q 50/184 715/255 |
| 8,401,949 | B1 * | 3/2013 | Brady | .................... | G06Q 40/06 705/36 R |
| 8,498,913 | B2 * | 7/2013 | Jenson | .................. | G06Q 40/08 705/36 R |
| 8,566,184 | B1 * | 10/2013 | Paluck | .................. | G06Q 40/06 705/30 |
| 8,620,788 | B2 * | 12/2013 | Biske | .................... | G06Q 40/02 705/35 |
| 8,645,254 | B2 * | 2/2014 | Castille | .................. | G06Q 40/06 705/36 R |
| 8,781,906 | B2 * | 7/2014 | Cruttenden | ............ | G06Q 40/06 705/16 |
| 11,790,431 | B2 * | 10/2023 | Merz | ........................ | G06F 7/08 705/26.62 |
| 12,217,202 | B1 * | 2/2025 | Samuel | .................... | H04W 4/12 |
| 2014/0018951 | A1 | 1/2014 | Linton et al. | | |
| 2014/0108295 | A1 * | 4/2014 | Renshaw | ............... | G06Q 40/06 705/36 R |
| 2017/0180193 | A1 * | 6/2017 | Shanware | .............. | G06Q 50/01 |
| 2018/0359139 | A1 * | 12/2018 | Shanware | .............. | H04L 43/16 |

FOREIGN PATENT DOCUMENTS

| | | |
|---|---|---|
| JP | 2002133036 A | 5/2002 |
| JP | 2014131351 A | 7/2014 |
| WO | 2014192756 A1 | 12/2014 |
| WO | 2020/084149 A1 | 4/2020 |

OTHER PUBLICATIONS

ISR-WO dated Dec. 10, 2019 for parent application PCT/EP2019/079292.

* cited by examiner

*Primary Examiner* — Dylan C White
(74) *Attorney, Agent, or Firm* — Vorys, Sater, Seymour and Pease LLP

(57) ABSTRACT

Systems and methods for generating and providing an executable notification to a user based on their interactions with a system. The method involves prompting the user to input values for various preferences, and continuously receiving messages from multiple information sources related to predefined physical and virtual entities, which are stored as context data. An allocation proposition is created by assigning values to the entities, and compared to a comparative composition of entities. The executable notification, which includes the allocation proposition, is provided based on the comparison. User preferences, including regularization types and levels, are incorporated to filter and process messages. Sources are uncertainty and impact, which is used to suppress messages from sources with high uncertainty or significance. The user is prompted to change information sources and obtain a sentiment score, which is used to adjust the system's belief in information sources. User authorization is required to execute the notification.

14 Claims, No Drawings

SYSTEM-USER INTERACTION RELATING TO ADVICE

TECHNICAL FIELD

The invention pertains to the technical field of computer network processing techniques on a large data stream, whereby certain user preferences are received, and an allocation proposition over a plurality of physical and optionally virtual entities is created based on said data stream, the user preferences and other factors.

BACKGROUND

The applicant noticed that there is a lack of computer-implemented systems which are capable of distributing finite quantities over a plurality of physical and/or virtual entities, whereby the distribution takes into account information from a plurality of information sources, user-prompted preferences (which comprise among others a valuation or user rating of said information sources) and factors which at least define geographical information and application field information for each of the entities. Said proposed distribution is compared to one or more comparative compositions which are based on the user preferences and the factors, and offered to the user based on said comparison.

U.S. patent Ser. No. 13/935,195 describes a system that governs a supply chain dynamically, by analysis of outside information sources, such as news channels, regarding possibly influencing vents, and estimating an impact (logistical and/or financial) on the supply chain. However, this is a rigid system that is focused entirely on a supply chain, and cannot be rapidly modified to suit other needs, or specific user preferences.

Other similar systems, as described in U.S. Pat. No. 7,680,719, are known in the art, but are lacking either in user interaction (in that a user who does not have administrative power to change the inner workings of the system, cannot provide personalized preferences), or in that the used information sources are not properly screened, or in that there is no 'practical' filter, which, for instance, would weed out geographically impossible or highly unlikely suggestions.

The invention thereto aims to address at least some of the problems mentioned.

SUMMARY OF THE INVENTION

In a first aspect, the present invention provides a method for providing a system-generated executable notification for a user, based on interaction between a user and said system.

In a second aspect, the present invention provides a computer system for generating an executable notification for a user, based on interaction between a user and said system.

In a further aspect, the present invention provides the use of the first aspect method or the second aspect computer system.

Further preferred embodiment and their advantages are described in the detailed description and the claims.

DETAILED DESCRIPTION OF THE INVENTION

As used herein, the following terms have the following meanings:

"A", "an", and "the" as used herein refers to both singular and plural referents unless the context clearly dictates otherwise. By way of example, "a compartment" refers to one or more than one compartment.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

The recitation of numerical ranges by endpoints includes all numbers and fractions subsumed within that range, as well as the recited endpoints.

The term information source may relate to any data channel, data stream, data set, or data subscription service providing content in a file-based, update-based, synchronization-based and/or message-based format, whereby each information source not providing data in pure messages may be considered as equivalent to message based, whereby updated portions of data may relate to one or more new messages. The messages may be provided on demand by requesting it from storage, or may be sent in real time to the user, e.g., as an e-mail, a push message notification, an in-app message, a dedicated web interface, a web dashboard, or a news item in a feed. The messages may be delivered in the context of a subscription and/or an account with the provider of an information source.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

The present invention in a first aspect concerns a computer-implemented method for providing a system-generated executable notification for a user, based on interaction between a user and said system, comprising the steps of:

a. prompting the user for providing a value for a plurality of user preferences to the system;

b. repeatedly receiving, by a server, a plurality of messages originating from a plurality of information sources, said plurality of messages being directly and/or indirectly related to one or more predefined physical entities and one or more predefined virtual entities, whereby the received messages are stored as context data;

c. assigning at least one factor of each of at least two factor sets to each of the physical entities and to each of the virtual entities, whereby a first of said at least two factor sets relates to a geographical valuation of the physical and virtual entities, and a second of said at least two factor sets relates to an application field of the physical and virtual entities;

d. creating an allocation proposition, by allocating values to a plurality of the physical and virtual entities, whereby the aggregated allocated value of the physical entities is non-zero, and whereby the aggregated allocated value of the physical and virtual entities is equal to a user-predefined value, said allocation proposition comprising the physical and virtual entities with a non-zero allocated value, and each of the associated non-zero allocated values;

e. providing an executable notification to the user, whereby said executable notification comprises the allocation proposition;

characterized in that at least one of the user preferences define a user valuation of each of the information sources;

whereby the allocated values are calculated based on the values of the user preferences, the factors and the messages of the information sources, whereby the allocation proposition is compared to a comparative composition comprising a plurality of physical and virtual entities with a non-zero allocated value, whereby the aggregated non-zero allocated value of the entities of the comparative composition equal the user-predefined value, whereby the allocated values of the comparative composition are based on the values for the user preferences and the factors, and whereby the executable notification is provided based on the comparison of the allocation proposition with the comparative composition.

The above defined method offers an advantageous solution for entity management in numerous fields. Given the versatility of the method defined, said entities may vary strongly in their definition, ranging from various tangible tradable goods, such as foodstuffs, cars, raw materials, general supplies, coupons, art, property, livestock and others, to more elusive tradable goods such as stocks, equity, fixed income, cash, real estate, precious goods, investment fund and others.

A distribution of values for such entities may for instance be assigning a location for storage, a proprietor, a price, a storage cost, storage characteristics, transfer of said entities, etc. An optimized distribution of such parameters/values is strongly dependent on many agents, some explicit, others implicit or indirect.

A first of said agents can be user preferences, which often has a strong determinative quality in the distribution, and can act as a guide for the other agents to run an optimization, especially as the user preferences—in this case—reflect on the use of at least some of the other agents.

A second agent is the plurality of information sources. As mentioned, the user preferences amongst others define a user valuation of said information sources, which guides the allocation process, in that the valuation determines the 'weight' that each information source has in the allocation process. One user may prefer certain information sources to other (for instance Twitter feed over official Dow Jones news), and subvaluations may exist that further specify the weight for certain subsets of information of some information sources.

Thirdly, an agent may be a so-called 'factor' from a factor set. Said factors are assigned to each of the entities, and define a certain characteristic of the entity. At least one of said factors defines geographical information of the entity, and at least one factor defines an application field of the entity. The geographical information typically is a country, region or continent (but could be a city, a state, or a group of several of one or more of the above), that is representative for the entity. For instance, in the case of physical objects such as raw materials, this could be their point of origin (production area or the likes of such), or their actual physical location. In the case of virtual objects, this may represent the location of their proprietor or the location of a physical entity they are related to (such as in the case of stock, the location or region of the company that issues said stock). As for the application field, this may reflect the nature of the entity (for instance as defined above: stock, raw material, property, food, medical device, etc.), or more generally, the technical field to which it belongs: healthcare, technology, other. It is found that such factors often will have a strong influence on an optimal allocation. For instance, in the case of distribution of entities such as food, the geographical location will be crucial, as will be its 'category' (meat, dairy, grain, conservable, etc.) for optimal allocation. The same applies to, for instance, the construction of a portfolio of investments, where it is crucial that the entities there (whether physical or virtual) are defined by such factors, as location may influence security of physical goods, and thus their reliability/value, or may influence volatility in case of stock.

Furthermore, the factors of the entities define a base that allows the computer system to establish links to certain messages that impact said entities, which simplifies the calculation for the allocated values of the entities.

In these cases, user-defined constraints must often be placed on the allocated values, whether it be due to a limited available cargo space (weight and/or volume), limited refrigeration means, manpower, and/or even budgetary constrictions. As such, these are set as a maximal value for the aggregate allocated values to the entities.

In the end, the system generates an allocation proposition which basically comprises a listing of all of the entities with a non-zero allocated value, and the associated allocated value of said entities. This can be provided to and further analyzed by a (qualified) person and authorized, with or without changes or corrections (for instance, should the person have knowledge of information that was not in the system yet, or simply has certain objections due to previous experiences).

However, before the allocation proposition is provided to the user, it is compared to one or more other allocation propositions to verify the validity/efficiency. These 'known' comparative compositions may be taken from historical compositions in the past (both old system-generated compositions, user-generated propositions, and outside information, so-called benchmark distributions). In order to satisfy the requirement to be provided to the user, the allocation proposition must 'outperform' the comparative composition based on certain criteria.

Finally, the allocation proposition is provided as an actionable notification, which can be understood that it can be executed (possibly modifiable by the user as well) to affect a (technical) effect in reality.

In this document, the term "value" or "allocated value" can be understood to represent certain information regarding to an entity. These values may be an amount of said entity which is proposed to be 'used', as in: transported, purchased, or stored.

None of the prior art systems allows such an intricate interaction between a user and a system in order to generate allocation propositions. For instance, systems will generally bar the user from imparting a valuation on their input information. However, it should be understood that human experience can expertly guide the system in correctly valuing certain information sources, dependent on the subject (for instance, when distributing emergency supplies to combat a humanitarian crisis, a user may impart a greater value on 'quick' social media sources, such as Twitter, possibly with a further bias to believe certain specific trustworthy accounts against others, over classic sources, such as newspapers, that cannot deliver urgent content at the same speed). Oppositely, more volatile news sources (typically self-published, such as Twitter, Facebook, or self-published web content, etc.) can be rated lower than the traditional news sources, or other more regulated channels, when time is less an issue.

In a preferred embodiment, said user preferences comprise at least a regularization type preference and a regularization level preference;
preferably whereby said regularization type preference relates to either regularization without variable selection or to regularization with variable selection;

said regularization without variable selection more preferably relating to Tikhonov regularization or ridge-type regularization;

said regularization with variable selection more preferably relating to lasso regularization;

and preferably whereby said regularization level preference relates to a value, more preferably a real value, indicative of the intensity of said regularization.

Hereby, "regularization" refers to any mechanism that evaluates the messages of the information sources in view of the uncertainty and/or significance of the information source providing the messages that impact the output of the evaluation. This addresses the problem that despite messages being generated constantly, with a high level of "noise", i.e. a high uncertainty, a large part of the messages hardly (if at all) contributes to the eventual values generated by the evaluation. Regularization thus reflects a level of distrust with respect to the outputs generated by the evaluation, based on mathematical notions of stability. Regularization can hence be understood as a three step approach:

define some notion of normality for each information source, typically an absence of messages, or a "zero signal";

model the stream of messages from every information source as a sum of content and noise, or "real signal +noise";

remove the noise by pushing the output of the evaluation, or "the total signal", closer to what is normal.

In one variant, the regularization boils down to automatically scaling the impact of incoming messages according to their uncertainty, while retaining all messages from all sources, and preferably updating a reference value of the evaluation for each arrival. The triggering of a notification may then relate to messages from any information source, whereby regularization may suppress some of the anomalies or outliers. Hereby, the user may preferably control the intensity of said regularization via said regularization level preference. In a corresponding and/or related preferred embodiment, said regularization type preference relates to regularization without variable selection; said regularization without variable selection preferably relating to Tikhonov regularization or ridge-type regularization; wherein said regularization level preference relates to a value, preferably a real value, indicative of the intensity of said regularization.

In another variant, the regularization corresponds to automatically suppressing information sources, for some period in time, for which messages are either deemed too uncertain, or of too little significance, while scaling the other messages according to their uncertainty. The allocation proposition may then be based only on messages from only the information sources that were not suppressed, whereby regularization may further scale the impact of those messages that are not suppressed. Hereby, the user may preferably control the intensity of said regularization via said regularization level preference. In a corresponding and/or related preferred embodiment, said regularization type preference relates to regularization with variable selection; said regularization with variable selection preferably relating to lasso regularization; wherein said regularization level preference relates to a value, preferably a real value, indicative of the intensity of said regularization.

With regularization, the user is further provided with a useful tool to assess the value of various information sources, which greatly supports the working of the allocation of values to the entities.

In a preferred embodiment, the values allocated to the entities of the allocation proposition are calculated furthermore based on at least one user-selected optimization model, said optimization model selected from a list comprising at least Black-Litterman model, Markowitz model and minimum variance model.

In a preferred embodiment, the information sources comprise a direct context information source, a structured peripheral information source, an unstructured peripheral information source and a conjectural direct context information source, whereby data of the direct context information source is enriched via feature engineering, and preferably whereby data of the conjectural direct context information source and/or of the structured peripheral information source is enriched via feature engineering.

In a preferred embodiment, said plurality of information sources comprises at least one unstructured peripheral information source;

wherein at least one message originating from said unstructured peripheral information source comprises a raw text string;

comprising a step of comparing said message to said context data using natural language processing of said raw text string for assessing a relevance of said message with respect to said context data;

whereby the allocated values are calculated furthermore on said assessment.

In a further preferred embodiment, messages from the unstructured peripheral information source are processed before use in calculated the allocated values, whereby said processing comprises a structuring of said messages of the unstructured peripheral information source via a self-learning artificial intelligence, whereby said artificial intelligence operates under user-tunable hyperparameters.

In a preferred embodiment, the physical and virtual entities are each attributed a predictability rating based on at least historical information of said physical and virtual entities in the context data, whereby the allocated values of the allocation proposition are furthermore calculated based on said predictability ratings.

Knowledge of the 'predictability' of certain entities can aid in forecasting further developments, and can be useful in creating a certain balance or security in the total allocation proposition.

In a preferred embodiment, the prompted user preferences comprise one or more constraints, said constraints comprising at least a user-defined minimal predictability rating of the physical and/or virtual entities with a non-zero allocated value in the allocation proposition, and/or a user-defined minimal aggregate predictability rating of the physical and virtual entities with a non-zero allocated value in the allocation proposition.

As mentioned, when ignoring the predictability rating of entities, it is possible that a very risky allocation proposition is created, which may be efficient or advantageous, but only in the supposition that everything goes according to plan. Even when a moderate stance is taken on the future effects of each entity, there will still be a strong difference in the potential variation of the effects for each entity (for instance disastrous harvests, production problems, etc. will impact certain entities stronger), which is not reflected in a forecast. Therefore, depending on the situation (urgency, location . . . ), a user may allow a higher or lower predictability rating of the allocation proposition.

In a preferred embodiment, the prompted user preferences comprise one or more constraints for creating the allocation proposition, said constraints comprising at least a maximal number and/or minimal number of physical and/or virtual entities with a non-zero allocated value in the allocation proposition, and/or a maximal and/or minimal value for the allocated values of the physical and/or virtual entities in the allocation proposition.

In a preferred embodiment, the user preferences comprise a historical allocation composition which comprises one or more of the physical and/or virtual entities with non-zero historical values, whereby an objective cost function is defined in the system based on the context data which is adapted for calculating a rebalancing cost for converting the historical allocation composition into the allocation proposition.

The historical allocation composition comprises a 'current', or 'latest' (or expected) allocation composition, representing the last known values for the entities (or at least for the entities which have a non-zero allocated value in either the allocation proposition and/or in the historical allocation composition. In some cases, changing the values will bring forth a certain cost, be it administrative, governmental, or practical, such as certain taxes, transport costs, etc. Note that this cost need not necessarily be 'monetary', but can be a cost in time to enact a certain change, or a cost in personnel (manpower), or even in space (volume/weight). In order to present an allocation proposition, these costs must be taken into account by the user, as they can impact the advantage of the presented allocation proposition (for instance, a too high time cost may negate all other advantages of a proposition).

In a preferred embodiment, the prompted user preferences comprise at least one constraint for creating the allocation proposition, whereby said constraint is a maximal value for the rebalancing cost for converting the historical allocation composition into the allocation proposition.

In a preferred embodiment, the context data is furthermore processed via ensemble learning. By combining multiple learning algorithms, the predictive performance of the entire process is improved.

In a preferred embodiment, the user preferences comprise at least one constraint on the context data on which the calculation of the allocated values is based, whereby said constraint is dependent on at least one of the following: period in which the message comprising said context data is generated, user valuation of the information source of the message comprising said context data. This allows the user to put a focus on information from a certain period, for instance, in order to simplify the evaluation process.

In a second aspect, the invention pertains to a computer system for generating an executable notification for a user, based on interaction between a user and said system, comprising:

a. a server, the server comprising a processor, tangible non-volatile memory, program code present on said memory for instructing said processor, connection means for connecting to a device of said user and to one or more remote servers;

b. said device of said user, the user device comprising a processor, tangible non-volatile memory, program code present on said memory for instructing said processor, a screen for displaying information to said user, preferably input means for receiving a user input means from a user, connection means for connecting to said server via said computer network;

c. said one or more remote servers, each of said remote servers relating to at least one of said plurality of information sources, each of said one or more remote servers comprising connection means for connecting to said server via said computer network;

d. at least one computer-readable medium, the at least one computer-readable medium accessible to said server and comprising a database, said database comprising context data and user preference data, the at least one computer-readable medium preferably comprised in said server;

said computer system configured for generating said executable notification for said user, whereby generating said executable notification comprises the following steps:

prompting the user for providing a value for a plurality of user preferences to the system;

repeatedly receiving, by a server, a plurality of messages originating from a plurality of information sources, said plurality of messages being directly and/or indirectly related to one or more predefined physical entities and one or more predefined virtual entities, whereby the received messages are stored as context data;

assigning at least one factor of each of at least two factor sets to each of the physical entities and to each of the virtual entities, whereby a first of said at least two factor sets relates to a geographical valuation of the physical and virtual entities, and a second of said at least two factor sets relates to an application field of the physical and virtual entities;

creating an allocation proposition, by allocating values to a plurality of the physical and virtual entities, whereby the aggregated allocated value of the physical entities is non-zero, and whereby the aggregated allocated value of the physical and virtual entities is equal to a user-predefined value, said allocation proposition comprising the physical and virtual entities with a non-zero allocated value, and each of the associated non-zero allocated values;

providing an executable notification to the user, whereby said executable notification comprises the allocation proposition;

whereby at least one of the user preferences defines a user valuation of each of the information sources;

whereby the allocated values are calculated based on the values of the user preferences, the factors and the messages of the information sources, whereby the allocation proposition is compared to a comparative composition comprising a plurality of physical and virtual entities with a non-zero allocated value, whereby the aggregated non-zero allocated value of the entities of the comparative composition equal the user-predefined value, whereby the allocated values of the comparative composition are based on the values for the user preferences and the factors.

In a third aspect, the invention pertains to the use of the method according to the invention in a system according to the invention.

The invention is further described by the following non-limiting examples which further illustrate the invention, and are not intended to, nor should they be interpreted to, limit the scope of the invention.

EXAMPLES

Example 1: Physical Entity Collection

In this example, the invention relates to the monitoring by a user of a physical object collection, said physical object collection comprising a plurality of physical goods or physical objects stored or located at a plurality of locations. The physical objects may for instance be precious goods with intrinsic value such as gold, diamonds, (oldtimer) cars, wine, whiskey, art paintings, musical instruments, or jewelry, but may also relate to precious goods of which the value is related to the right that is conferred to the owner, such as bearer bonds. In yet another example the physical objects may relate to real estate, e.g. an object may correspond to a house, a building, an apartment, an apartment block, a garage, a garage block. In a preferred example embodiment, each of the objects corresponds to a physical entity record stored in a database and vice versa. In one embodiment, the physical objects may relate to perishable goods which may suffer damage due to an incident relating to excessive temperatures or high moisture levels, as is e.g. the case for cars, wine, whiskey, art paintings, musical instruments, etc. Hereby, a first allocation proposition may relate to maximizing the total number of objects across locations that remains intact over a given time period, e.g., one year. For such an allocation proposition, in view of measurements and predictions for different locations available from different information sources, a notification may be generated whenever any of the locations is likely to suffer an incident based on a message originating from one of the information sources. However, a second allocation proposition may relate to maximizing the chance that at least one object remains intact over the given time period of, e.g., 1 year. This may for instance relate to hard disk drives or flash drives comprising highly confidential information which is duplicated across multiple locations, whereby the hard disk drives or flash drives may or may not be connected to a computer network depending on the level of confidentiality required, and whereby the data on the drives may or may not be encrypted. Such highly confidential information may for instance relate to passwords, credentials or cryptocurrency assets. For such an allocation proposition, predictions or measurements relating to a single location likely lack relevance and hence do not require a notification, unless a large majority of the objects is stored at that single location. Whether the latter is the case may be indicated by a strong alteration of the allocation proposition's output in case an indicator of an incident at that single location is detected. In various related example embodiments, one information source may be an alert service offering alerts relating to the integrity and safety of locations and/or buildings, such as the detection of an alarm or incident at an object location. Another information source may relate to a raw text service providing news messages. Hereby, the detection of said the name of said location and/or the name of a building relating to the location may indicate that the message has relevance in view of the allocation proposition.

An advantage of the invention lies in the control by the user of what is relevant and what is not, and to what extent notifications are required. Regularization enables selection of information sources which are meaningful to the end user. For instance, a news message from a single information source regarding a fire at a location may not be significant and may be deemed an outlier based on regularization, whereas multiple messages with highly similar content may indicate high relevance, and hence trigger a notification. Hereby, the strength of regularization allows to set a threshold depending on user preference. Moreover, the user may indicate whether he prefers regularization without variable selection or with variable selection. Overall, the user is relieved of the burden of manually going through all messages with potential relevance for the physical object collection. With regularization, the user is further provided with a useful tool to assess the value of various information sources. The invention can hence be of value in deciding which subscriptions to information sources (paying or not) should be kept and which may be removed.

Example 2: Portfolio of Tradable Goods

In this example, the context data relates to all information relating to a portfolio comprising a plurality of tradable goods of which at least two relate to a physical entity. The context data comprises a plurality of data records including at least two physical entity records, each of the physical entity records relating to a physical entity. The physical entity may be any physical investment product, for instance gold, diamonds, (oldtimer) cars, wine, whiskey, art paintings, collector's items, musical instruments, jewelry, bearer bonds, a house, a building, an apartment, an apartment block, a garage, a garage block. Beyond physical entity records, the portfolio may or may not comprise data records which do relate to entities that are not physical entities. Each of the data records is a structured set of entries for a number of attributes. One attribute may be the type of entity, e.g. stocks, equity, fixed income, cash, real estate, precious goods, investment fund, etc. Another attribute may indicate an amount of said entity. Yet another attribute may relate to a starting date or an ending date of a commitment related to said entity. In analogy with Example 1, another attribute may be a location of said entity, specified, e.g., in terms of a street address or a set of GPS coordinates. Another attribute may allow for a natural language description of the entity, which may be taken into account through natural language processing.

The allocation proposition relates to a technical aim for said portfolio. The formulation of the allocation proposition relates to a training of a plurality of parameters on the history of each of the information sources. The allocation proposition may or may not further relate to an application of the Black-Litterman optimization. The information sources include pre-structured data comprising records comprising entries for a plurality of fields, as well as unstructured data comprising raw text. The pre-structured data provides indicators for news intensity, news sentiment and news readership, both at company level and at aggregate level. The pre-structured data may relate to an index. The user is further provided with possibilities of changing the information sources upon which a sentiment score is built, to cater to evolutions in social media use, evolutions in formal press. Hereby, sentiment is typically measured relative to some historical standard, but the relevant standard can be modified to emphasize belief in certain opinion makers. The process flow can be changed as well, with e.g. the date update being daily or more frequent.

The automated process hence feeds the human process, with added value for the portfolios being monitored. Particularly, the invention provides a comprehensive alternative to purely manual processing, provides a partial alternative to sub-decisions, and provides information generated in the process. Big shifts in forecasts can trigger a notification with explanation which is sent to users, e.g. portfolio managers, who can then rebalance their portfolios. The invention further allows to identify whether certain entities and/or the related financial instruments are being overvalued. Furthermore, the user may be warned of high volumes of negative news building up around a certain entity. Moreover, when e.g. the stock of some company has plummeted, an indirect link with several entities may be established based on linked companies and sectors that might be affected.

The way in which a notification may be generated for a user is further analogous to Example 1. Also in this example, the user is assisted in the burden of going through all messages with potential relevance for the portfolio. With regularization, the user is further provided with a useful tool to assess the value of various information sources. The invention can hence be of value in deciding which subscriptions to information sources (paying or not) should be kept and which may be removed

Example 3: Crisis Supply Distribution

In this example, the context data relates to information regarding a regional crisis situation, such as a famine, outbreak of disease, natural disaster, etc. The information sources in this case be traditional media (tv, newspaper, online coverage), social media (Twitter, Facebook, Instagram, Tencent, Weibo, Youtube), and others. The entities in this case may relate to food, medicinal supplies, infrastructural supplies (tents, . . . ), financial support and others. The user may then provide certain values in response to prompts of the system, amongst which a valuation of the information sources. In these cases, unstructured information sources can be very relevant as they quickly identify dangerous situations on a local level (for instance certain villages where an outbreak has erupted), while larger media coverage will miss these or refuse to report without further confirmation. The user may thus give a greater valuation to such sources. Other information that will be imparted are geographical details, and the nature of the crisis.

The system will have access to a database on a large amount of entities with information on said entities, for instance grain supplies in surrounding areas (countries, regions, cities, etc.), medicinal supplies as well as medical personnel from certain organizations (Doctors without Borders, . . . ), transport capacity (X number of cargo planes with Y capacity in country Z, . . . ). Note that said database will be updated via the influx of information from the information sources. Based on this, the system can generate, on time-basis, a proposal for allocating resources to address a crisis. Said proposal will allocate values to a plurality of entities, which values can indicate whether or not these will be used (for instance, if certain supplies cannot be provided in time from certain locations, they will not be used), how much of them will be used, and how they will be provided.

It is supposed that the present invention is not restricted to any form of realization described previously and that some modifications can be added to the presented example of fabrication without reappraisal of the appended claims. For example, the present invention has been described referring to distributions of goods, commodities and others, both physical and virtual, but it is clear that the invention can be used for other applications.

The invention claimed is:

1. Computer-implemented method for providing a system-generated executable notification for a user, based on interaction between a user and said system, comprising the steps of:
   a. prompting the user for providing a value for a plurality of user preferences to the system;
   b. repeatedly receiving, by a server, a plurality of messages originating from a plurality of information sources, said plurality of messages being directly and/or indirectly related to one or more predefined physical entities and one or more predefined virtual entities, whereby the received messages are stored as context data;
   c. assigning at least one factor of each of at least two factor sets to each of the physical entities and to each of the virtual entities, whereby a first of said at least two factor sets relates to a geographical valuation of the physical and virtual entities, and a second of said at least two factor sets relates to an application field of the physical and virtual entities;
   d. creating an allocation proposition, by allocating values to a plurality of the physical and virtual entities, whereby the aggregated allocated value of the physical entities is non-zero, and whereby the aggregated allocated value of the physical and virtual entities is equal to a user-predefined value, said allocation proposition comprising the physical and virtual entities with a non-zero allocated value, and each of the associated non-zero allocated values;
   e. providing an executable notification to the user, whereby said executable notification comprises the allocation proposition;
      wherein at least one of the user preferences define a user valuation of each of the information sources;
      whereby the allocated values are calculated based on the values of the user preferences, the factors and the messages of the information sources, whereby the allocation proposition is compared to a comparative composition comprising a plurality of physical and virtual entities with a non-zero allocated value, whereby the aggregated non-zero allocated value of the entities of the comparative composition equal the user-predefined value, whereby the allocated values of the comparative composition are based on the values for the user preferences and the factors, and whereby the executable notification is provided based on the comparison of the allocation proposition with the comparative composition;
      wherein said user preferences comprise at least a regularization type preference and a regularization level preference, said regularization comprising the steps of:
      defining normality for each information source;
      modelling the stream of messages from every information source as a sum of content and noise;
      removing the noise by pushing the output of the evaluation closer to what is normal;
      whereby said regularization type preference relates to either regularization without variable selection or to regularization with variable selection;
      said regularization without variable selection relating to Tikhonov regularization or ridge-type regularization;
      said regularization with variable selection relating to lasso regularization;
      whereby the messages are retained from all sources;
      wherein each message is attributed an uncertainty, a significance and an impact and whereby said regularization comprises automatically suppressing information sources of which the uncertainty or significance of the messages therefrom exceeds a threshold, for a predefined period of time, while scaling other messages than those of said suppressed information sources, according to their uncertainty, wherein the server suppresses at least one information source such that the executable notification is not based on the at least one information source and the user is not provided messages from the at least one information source;
      wherein selection of messages is based on attributed uncertainty, impact, and noise to reduce transmission bandwidth;
      the method further comprising the steps of:
      requesting the user to change information sources, upon which a sentiment score is made, said sentiment score being used to emphasize the belief of the user on information source; and requesting authorization of the user and of executing the actionable notification when said authorization is positive.

2. Computer-implemented method according to claim 1, whereby said regularization level preference relates to a value, more preferably a real value, indicative of the intensity of said regularization.

3. Computer-implemented method according to claim 1, wherein the values allocated to the entities of the allocation proposition are calculated furthermore based on at least one user-selected optimization model, said optimization model selected from a list com prising at least Black-Litterman model, Markowitz model and minimum variance model.

4. Computer-implemented method according to claim 1, wherein the information sources comprise a direct context information source, a structured peripheral information source, an unstructured peripheral information source and a conjectural direct context information source, whereby data of the direct context information source is enriched via feature engineering, and preferably whereby data of the conjectural direct context information source and/or of the structured peripheral information source is enriched via feature engineering.

5. Computer-implemented method according to claim 1, wherein said plurality of information sources comprises at least one unstructured peripheral information source;

wherein at least one message originating from said unstructured peripheral information source com prises a raw text string;

comprising a step of comparing said message to said context data using natural language processing of said raw text string for assessing a relevance of said message with respect to said context data;

whereby the allocated values are calculated based furthermore on said assessment.

6. Computer-implemented method according to claim 1, wherein messages from the unstructured peripheral information source are processed before use in calculated the allocated values, whereby said processing com prises a structuring of said messages of the unstructured peripheral information source via a self-learning artificial intelligence, whereby said artificial intelligence operates under user-tunable hyperparameters.

7. Computer-implemented method according to claim 1, wherein the physical and virtual entities are each attributed a predictability rating based on at least historical information of said physical and virtual entities in the context data, whereby the allocated values of the allocation proposition are furthermore calculated based on said predictability ratings.

8. Computer-implemented method according to claim 1, wherein the prompted user preferences comprise one or more constraints, said constraints comprising at least a user-defined minimal predictability rating of the physical and/or virtual entities with a non-zero allocated value in the allocation proposition, and/or a user-defined minimal aggregate predictability rating of the physical and virtual entities with a non-zero allocated value in the allocation proposition.

9. Computer-implemented method according to claim 1, wherein the prompted user preferences comprise one or more constraints for creating the allocation proposition, said constraints comprising at least a maximal number and/or minimal number of physical and/or virtual entities with a non-zero allocated value in the allocation proposition, and/ or a maximal and/or minimal value for the allocated values of the physical and/or virtual entities in the allocation proposition.

10. Computer-implemented method according claim 1, wherein the user preferences comprise a historical allocation composition which comprises one or more of the physical and/or virtual entities with non-zero historical values, whereby an objective cost function is defined in the system based on the context data which is adapted for calculating a rebalancing cost for converting the historical allocation composition into the allocation proposition.

11. Computer-implemented method according to claim 1, wherein the prompted user preferences comprise at least one constraint for creating the allocation proposition, whereby said constraint is a maximal value for the rebalancing cost for converting the historical allocation composition into the allocation proposition.

12. Computer-implemented method according to claim 1, wherein the context data is furthermore processed via ensemble learning.

13. Computer-implemented method according to claim 1, wherein the user preferences comprise at least one constraint on the context data on which the calculation of the allocated values is based, whereby said constraint is dependent on at least one of the following: period in which the message comprising said context data is generated, user valuation of the information source of the message comprising said context data.

14. A computer system for generating an executable notification for a user, based on interaction between a user and said system, comprising:

a. a server, the server comprising a processor, tangible non-volatile memory, program code present on said memory for instructing said processor, connection means for connecting to a device of said user and to one or more remote servers;

b. said device of said user, the user device comprising a processor, tangible non-volatile memory, program code present on said memory for instructing said processor, a screen for displaying information to said user, preferably input means for receiving a user input means from a user, connection means for connecting to said server via said computer network;

c. said one or more remote servers, each of said remote servers relating to at least one of said plurality of information sources, each of said one or more remote servers comprising connection means for connecting to said server via said computer network;

d. at least one computer-readable medium, the at least one computer-readable medium accessible to said server and comprising a database, said database comprising context data and user preference data, the at least one computer-readable medium preferably comprised in said server;

said computer system configured for generating said executable notification for said user, whereby generating said executable notification comprises the following steps:

prompting the user for providing a value for a plurality of user preferences to the system;

repeatedly receiving, by a server, a plurality of messages originating from a plurality of information sources, said plurality of messages being directly and/or indirectly related to one or more predefined physical entities and one or more predefined virtual entities, whereby the received messages are stored as context data;

assigning at least one factor of each of at least two factor sets to each of the physical entities and to each of the virtual entities, whereby a first of said at least two factor sets relates to a geographical valuation of the physical and virtual entities, and a second of said at least two factor sets relates to an application field of the physical and virtual entities;

creating an allocation proposition, by allocating values to a plurality of the physical and virtual entities, whereby the aggregated allocated value of the physical entities is non-zero, and whereby the aggregated allocated value of the physical and virtual entities is equal to a user-predefined value, said allocation proposition com pris-ing the physical and virtual entities with a non-zero allocated value, and each of the associated non-zero allocated values;

providing an executable notification to the user, whereby said executable notification comprises the allocation proposition;

wherein at least one of the user preferences defines a user valuation of each of the information sources;

whereby the allocated values are calculated based on the values of the user preferences, the factors and the messages of the information sources, whereby the allocation proposition is compared to a comparative composition comprising a plurality of physical and virtual entities with a non-zero allocated value, whereby the aggregated non-zero allocated value of the entities of the comparative composition equal the user-predefined value, whereby the allocated values of the comparative composition are based on the values for the user preferences and the factors, and whereby the executable notification is provided based on the com-parison of the allocation proposition with the compara-tive composition, wherein said user preferences com-prise at least a regularization type preference and a regularization level preference, said regularization comprising the steps of:

defining normality for each information source;

modelling the stream of messages from every informa-tion source as a sum of content and noise;

removing the noise by pushing the output of the evalu-ation closer to what is normal;

whereby said regularization type preference relates to either regularization without variable selection or to regularization with variable selection;

said regularization without variable selection relating to Tikhonov regularization or ridge-type regulariza-tion;

said regularization with variable selection relating to lasso regularization; whereby the messages are retained from all sources;

wherein each message is attributed an uncertainty, a significance and an impact and whereby said regu-larization comprises automatically suppressing information sources of which the uncertainty or significance of the messages therefrom exceeds a threshold, for a predefined period of time, while scaling other messages than those of said suppressed information sources, according to their uncertainty, wherein the system suppresses at least one informa-tion source such that the executable notification is not based on the at least one information source and the respective server is not provided messages or notifications from the at least one information source;

wherein selection of messages is based on attributed uncertainty, impact, and noise to reduce transmission bandwidth;

the steps further comprising:

requesting the user to change information sources, upon which a sentiment score is made, said senti-ment score being used to emphasize the belief of the user on information source; and requesting authorization of the user and of executing the actionable notification when said authorization is positive.

* * * * *